(12) United States Patent
Inomata et al.

(10) Patent No.: US 9,045,993 B2
(45) Date of Patent: Jun. 2, 2015

(54) STEAM TURBINE (75) Inventors: Asako Inomata, Yokohama (JP);
Katsuya Yamashita, Tokyo (JP);
Kunihiko Wada, Yokohama (JP);
Kazuhiro Saito, Yokohama (JP); Yusuke Suzuki, Yokohama (JP); Takao Inukai, Kawasaki (JP); Shogo Iwai, Yokohama (JP); Takeo Suga, Yokohama (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 619 days.

(21) Appl. No.: 13/421,569

(22) Filed: Mar. 15, 2012

(65) Prior Publication Data

US 2012/0243978 A1    Sep. 27, 2012

(30) Foreign Application Priority Data

Mar. 24, 2011   (JP) .................. P2011-065469

(51) Int. Cl.
*F01D 11/00*    (2006.01)
*F16J 15/06*    (2006.01)
*F16J 15/08*    (2006.01)

(52) U.S. Cl.
CPC .......... *F01D 11/003* (2013.01); *F05D 2220/31* (2013.01); *F05D 2240/14* (2013.01); *F05D 2240/40* (2013.01); *F16J 15/064* (2013.01); *F16J 15/08* (2013.01); *F16J 15/0806* (2013.01)

(58) Field of Classification Search
CPC ... F01D 11/003; F01D 25/183; F01D 11/025; F01D 11/02; F16J 15/0806; F16J 15/064; F16J 15/08; F16J 15/441; F16J 15/44; F16J 15/32; F16J 15/54; F16J 15/40

USPC ......... 415/168.1, 170.1, 174.2, 200; 277/409, 277/413, 417, 422, 421, 500, 578–579
See application file for complete search history.

(56) References Cited

U.S. PATENT DOCUMENTS

| 5,037,115 | A | * | 8/1991 | Brandon | ................. 277/606 |
| 5,169,674 | A | * | 12/1992 | Miller | ................. 427/456 |
| 5,433,453 | A | * | 7/1995 | Dalton | ................. 277/606 |
| 8,393,861 | B2 | | 3/2013 | Wada et al. | |

FOREIGN PATENT DOCUMENTS

| JP | 11-229817 | 8/1999 |
| JP | 2001-271608 | 10/2001 |
| WO | WO 2010/061601 A1 | 6/2010 |

\* cited by examiner

*Primary Examiner* — Edward Look
*Assistant Examiner* — Danielle M Christensen
(74) *Attorney, Agent, or Firm* — Finnegan, Henderson, Farabow, Garrett & Dunner, L.L.P.

(57) ABSTRACT

A steam turbine 10 of an embodiment has seal rings 60 between an inlet sleeve 40 for introducing steam and an inner casing 20 and an outer casing 21 into which the inlet sleeve 40 is inserted. The seal rings 60 have high-temperature side seal rings 70 which are disposed their inner circumferences contacted to the outer circumference of the inlet sleeve 40, and low-temperature side seal rings 80 which are formed to have inner and outer diameters larger than those of the high-temperature side seal rings 70 and disposed with their outer circumferences contacted to the inner casing 20 or the outer casing 21. A thermal barrier layer 90 is disposed between the inner circumferences of the high-temperature side seal rings 70 and the outer circumference of the inlet sleeve 40 and between the high-temperature side seal rings 70 and the low-temperature side seal rings 80.

13 Claims, 6 Drawing Sheets

STEAM TURBINE

CROSS-REFERENCE TO RELATED APPLICATION

This application is based upon and claims the benefit of priority from Japanese Patent Application No. 2011-065469, filed on Mar. 24, 2011; the entire contents of which are incorporated herein by reference.

FIELD

Embodiments described herein relate generally to a steam turbine.

BACKGROUND

Today, a steam turbine using steam at a temperature of about 600° C. has been put into practical use in view of improving the turbine efficiency. In addition, it is now being studied and developed to raise the steam temperature to 650° C. or more in order to improve the turbine efficiency.

Since the above steam turbine uses the steam of high temperature, it is necessary to use a heat-resistant alloy resistive to that temperature. But, such a heat-resistant alloy is used in a limited range because it is expensive, and it is difficult to produce large-size parts.

For example, a steam inlet pipe such as an inlet sleeve where high temperature steam flows is made of a Ni-base alloy or the like having excellent heat resistance, and seal rings contacted to the steam inlet pipe and casings contacted to the seal rings are formed of CrMoV steel or 12Cr steel.

As described above, the main steam of high temperature flows through the inlet sleeve, and heat is conducted to the casings via the seal rings which are contacted to the inlet sleeve. Therefore, the temperatures of the seal rings and the casings are raised as the main steam increases to a high temperature, and it is necessary to take measures against heat when a conventional material is used to configure the seal rings and the casings.

DETAILED DESCRIPTION

In one embodiment, a steam turbine is provided with annular seal rings between a steam inlet pipe for introducing steam and casings into which the steam inlet pipe is inserted. The seal rings include high-temperature side seal rings which are disposed with their inner circumferences contacted to the outer circumference of the steam inlet pipe, and low-temperature side seal rings which are formed to have inner and outer diameters larger than those of the high-temperature side seal rings and disposed with their outer circumferences contacted to the casings.

And, a thermal barrier layer is disposed (1) between the inner circumferences of the high-temperature side seal rings and the outer circumference of the steam inlet pipe and between the high-temperature side seal rings and the low-temperature side seal rings, (2) between the high-temperature side seal rings and the low-temperature side seal rings, or (3) between the outer circumferences of the low-temperature side seal rings and the casings.

Embodiments of the invention are described below with reference to the drawings.

First Embodiment

Figure 1:
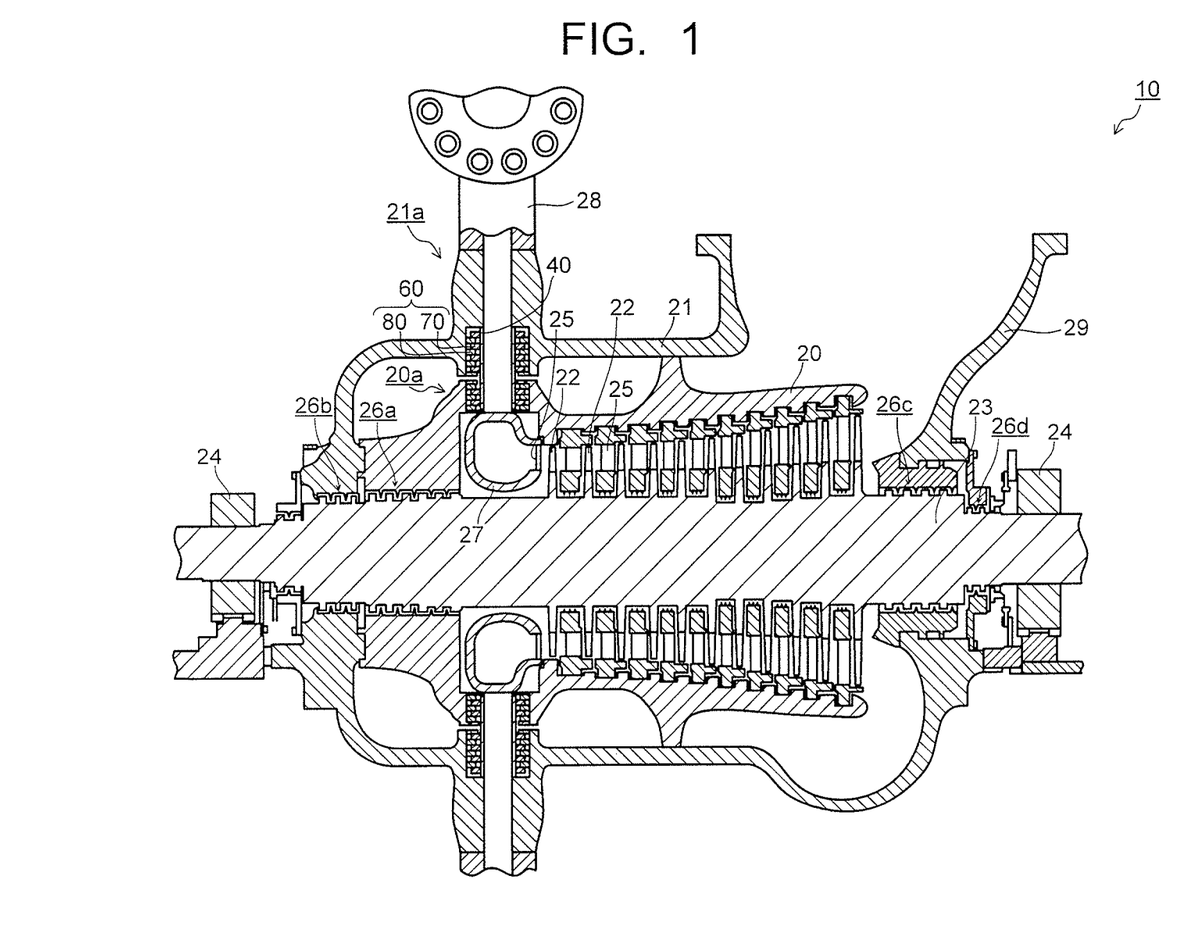
FIG. 1 is a diagram showing a meridional cross section of the steam turbine of a first embodiment.
Figure 2:
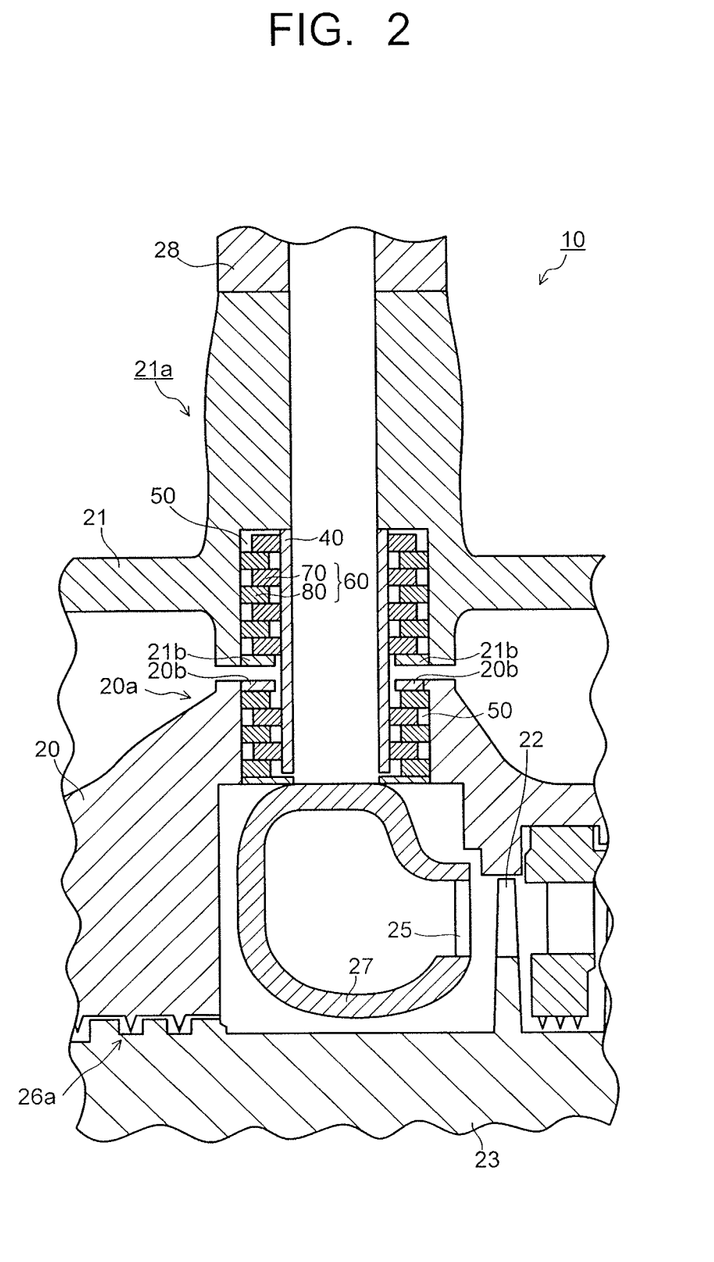
FIG. 2 is a diagram showing in a magnified fashion a cross section covering from an inlet portion of an outer casing to a nozzle box in the steam turbine of the first embodiment.

FIG. 1 is a diagram showing a meridional cross section of a steam turbine 10 of a first embodiment according to the present invention. FIG. 2 is a diagram showing in a magnified fashion a cross section of from an inlet portion 21a of an outer casing 21 to a nozzle box 27 in the steam turbine 10 of the first embodiment according to the present invention. Like component parts corresponding to those of the following embodiments are denoted by like reference numerals, and overlapped descriptions will be omitted or simplified.

As shown in FIG. 1, the steam turbine 10 has a double-structured casing which is comprised of an inner casing 20 and the outer casing 21 which is disposed on the outside of it. And, a turbine rotor 23 where moving blades 22 are implanted is disposed through the inner casing 20. This turbine rotor 23 is rotatably supported by rotor bearings 24.

On the inner surface of the inner casing 20, stationary blades 25 are arranged alternately with the moving blades 22 in the axial direction of the turbine rotor 23. Gland labyrinth portions 26a, 26b, 26c and 26d are disposed between the turbine rotor 23 and the individual casings to prevent the steam as the working fluid from leaking outside.

As shown in FIG. 1 and FIG. 2, an inlet portion 20a of the inner casing 20 is provided with a nozzle box 27. The nozzle box 27 is disposed between the inner casing 20 and the turbine rotor 23 (namely, an inner portion of the inlet portion 20a of the inner casing 20). An outlet portion of the nozzle box 27 is provided with first stage stationary blades 25 (first stage nozzles). Steam supplied to the nozzle box 27 is led to the first stage moving blades 22 through the first stage stationary blades 25.

An inlet sleeve 40 is disposed between and connected to the inlet portion 21a of the outer casing 21 and the inlet portion 20a of the inner casing 20 and functions as a steam inlet pipe. This inlet sleeve 40 leads the steam, which is from a main steam pipe 28, into the nozzle box 27.

As shown in FIG. 2, recesses 50, which are respectively formed of an enlarged bore portion having a bore larger than that of a steam inlet of the outer casing 21, are formed on the side of the inner casing 20 of the inlet portion 21a of the outer casing 21 and on the side of the outer casing 21 of the inlet portion 20a of the inner casing 20. The inlet sleeve 40 is inserted into the recesses 50 via a plurality of seal rings 60. It is preferable that the inlet sleeve 40 is configured to have an inner diameter same to or little larger than the bore of the steam inlet of the outer casing 21.

The inlet sleeve 40 is fixed by being inserted into the recesses 50 via the plurality of seal rings 60 and, for example, suppressed from being moved in the axial direction of the inlet sleeve 40. The end portion of the inlet sleeve 40 on the side of the inner casing 20 is a free end and stretchable in the axial direction of the inlet sleeve 40.

An end portion 21b of the inlet portion 21a of the outer casing 21, which is on the side of the inner casing 20, and an end portion 20b of the inlet portion 20a of the inner casing 20, which is on the side of the outer casing 21, configure the recesses 50 and are removably connected to the respective casings by, for example, bolting or the like. The end portion 20b and 21b are mounted on the outer casing 21 or the inner casing 20 after the inlet sleeve 40 and the seal rings 60 are disposed in the recesses 50. Then, the end portion 20b and 21b are provided to suppress the seal rings 60 from moving in the vertical direction (the axial direction of the inlet sleeve 40).

The individual seal rings 60 are comprised of a high-temperature side seal ring 70 which is disposed with its inner circumference contacted to the outer circumference of the inlet sleeve 40, and a low-temperature side seal ring 80 which is configured to have its inner diameter and outer diameter larger than those of the high-temperature side seal ring 70 and disposed with its outer circumference contacted to the inner casing 20 or the outer casing 21. The high-temperature side seal ring 70 and the low-temperature side seal ring 80 are preferably formed to have, for example, a structure that they are alternately stacked in the axial direction of the inlet sleeve 40. Since the seal rings 60 have a stacked structure, steam can be secured by stopping (sealing) between the inlet sleeve 40 and the inner casing 20 or the outer casing 21.

The steam turbine 10 is also provided with an exhaust passage 29 which leads steam as a working fluid, which has flown through the steam passage in the inner casing 20 while performing the expansion work and passed through the final stage moving blade 22, from the interior of the inner casing 20 to the outside of the steam turbine 10.

The structure of the seal rings 60 is described in detail below.

Figure 3:
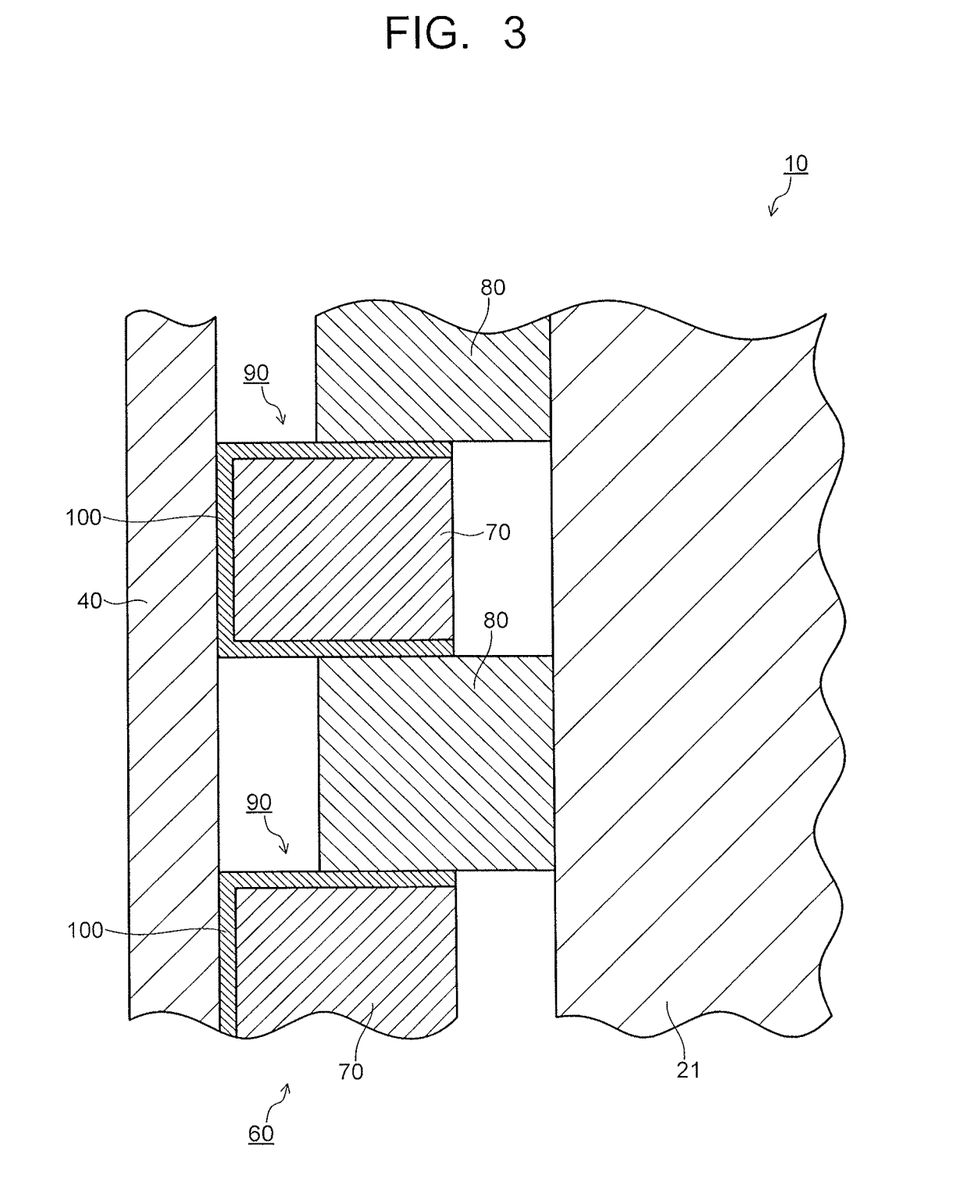
FIG. 3 is a diagram showing an enlarged cross section of seal rings between an inlet sleeve and the outer casing of the steam turbine of the first embodiment.

FIG. 3 is a diagram showing enlarged cross sections of the seal rings 60 between the inlet sleeve 40 and the outer casing 21 of the steam turbine 10 of the first embodiment according to the invention. Here, the structure of the seal rings 60 between the inlet sleeve 40 and the outer casing 21 are shown, but the seal rings 60 between the inlet sleeve 40 and the inner casing 20 also have the same structure.

As shown in FIG. 3, a thermal barrier layer 90 is formed between an inner circumference of the high-temperature side seal ring 70 and an outer circumference of the inlet sleeve 40 and between the high-temperature side seal ring 70 and the low-temperature side seal rings 80. For example, the thermal barrier layer 90 can be formed of a thermal barrier coating layer 100 which is formed on the inner circumferential surface of the high-temperature side seal ring 70 contacted to the outer circumference of the inlet sleeve 40 and on top and bottom surfaces of the high-temperature side seal ring 70 contacted to the low-temperature side seal rings 80.

Here, the thermal barrier coating layer 100 is entirely formed on the top and bottom surfaces of the high-temperature side seal ring 70, but the thermal barrier coating layer 100 may be formed on only a portion contacted to the low-temperature side seal ring 80. And, when the high-temperature side seal ring 70 is located at a stacked end portion, the thermal barrier coating layer 100 is formed on one surface, which is contacted to the low-temperature side seal ring 80, between the top and bottom surfaces of the high-temperature side seal ring 70 at the end.

The thermal barrier coating layer 100 is formed of a material having a thermal conductivity lower than that of the material forming the high-temperature side seal ring 70 and the low-temperature side seal ring 80. For example, the thermal barrier coating layer 100 is formed of an oxide material such as zirconia ($ZrO_2$), hafnia ($HfO_2$), ceria ($CeO_2$), titania ($TiO_2$), alumina ($Al_2O_3$), magnesia (MgO), rare earth zirconate ($X_2Zr_2O_7$, where X is a rare earth element such as Sc, Y, La, Ce, Pr or Nd).

Here, the high-temperature side seal ring 70 and the low-temperature side seal ring 80 are formed of, for example, a metallic material such as CrMoV steel or 12Cr. Such a material has a thermal conductivity of, for example, about 25 to 45 W/(m·K). On the other hand, the oxide material forming the thermal barrier coating layer 100 has a thermal conductivity of, for example, about 1 to 10 W/(m·K), which is lower than the thermal conductivity of the material forming the high-temperature side seal ring 70 and the low-temperature side seal ring 80.

Among the oxide materials forming the above-described thermal barrier coating layer 100, rare earth zirconate and hafnia have a low thermal conductivity and a relatively large coefficient of thermal expansion and, therefore, are suitable as the thermal barrier coating layer 100 formed on the surface of the metallic material. In addition, an intermediate layer of a MCrAlY alloy (M is a metal element having Ni, Co, Fe or the like as a main component) or the like having a coefficient of thermal expansion, which is between those of the materials forming the high-temperature side seal ring 70 and the thermal barrier coating layer 100, may be disposed between the high-temperature side seal ring 70 and the thermal barrier coating layer 100. Thus, thermal stress on the thermal barrier coating layer 100 is relieved.

The thermal barrier coating layer 100 is formed by thermal spraying such as atmospheric plasma spraying, physical vapor deposition, or the like. And, the thermal barrier coating layer 100 may also be formed by a slurry coating method that coats a slurry containing particles of the above-described oxide material, and then sintering. And, the thermal barrier coating layer 100 is preferably formed to have a thickness of about 0.1 mm to 1.0 mm to obtain a thermal barrier effect.

Here, it was described as an example that the thermal barrier coating layer 100 was formed on the top and bottom surfaces of the high-temperature side seal ring 70 as the thermal barrier layer 90 between the high-temperature side seal ring 70 and the low-temperature side seal ring 80, but the thermal barrier coating layer 100 may be formed on the top and bottom surfaces of the low-temperature side seal ring 80.

And, there was described an example that the thermal barrier coating layer 100 was formed on the inner circumferential surface of the high-temperature side seal ring 70 as the thermal barrier layer 90 between the inner circumference of the high-temperature side seal ring 70 and the outer circumference of the inlet sleeve 40, but the thermal barrier coating layer 100 may be formed on the outer circumferential surface of the inlet sleeve 40.

Then, heat transfer between the inlet sleeve 40 and the outer casing 21 of the steam turbine 10 is described below.

The steam introduced into the steam turbine 10 through the main steam pipe 28 is led into the nozzle box 27 through the inlet sleeve 40. The steam led into the nozzle box 27 flows while performing the expansion work through the steam passage between the stationary blades 25 arranged in the inner casing 20 and the moving blades 22 implanted in the turbine rotor 23 to rotate the turbine rotor 23. And, the steam having passed through the final-stage moving blades 22 is exhausted out of the steam turbine 10 through the exhaust passage 29.

The high temperature steam introduced through the main steam pipe 28 as described above passes through the inlet sleeve 40. At this time, heat is transmitted from the steam to the inlet sleeve 40 by heat transfer. Heat is transmitted from the inlet sleeve 40 to the high-temperature side seal ring 70, which is contacted to the inlet sleeve 40, by heat conduction. But, the heat transfer between them is suppressed because they have the thermal barrier coating layer 100 between them. In addition, since the high-temperature side seal ring 70 and the low-temperature side seal ring 80 also have the thermal barrier coating layer 100 between them, the heat transfer is suppressed.

Thus, the heat transfer from the inlet sleeve 40 to the high-temperature side seal ring 70, the low-temperature side seal ring 80 and the outer casing 21 is suppressed, and the high-temperature side seal ring 70, the low-temperature side seal ring 80 and the outer casing 21 can be suppressed from having a temperature increase. Therefore, even in a case where the steam temperature of the steam turbine 10 is raised to a high temperature, the high-temperature side seal ring 70, the low-temperature side seal ring 80 and the outer casing 21 can be formed of the same material as the conventional material.

The heat transfer between the inlet sleeve 40 and the inner casing 20 is also same as the above-described heat transfer. That is, the heat transfer to the high-temperature side seal ring 70, the low-temperature side seal ring 80 and the inner casing 20 is suppressed, and the high-temperature side seal ring 70, the low-temperature side seal ring 80 and the inner casing 20 can be suppressed from having a temperature increase. Therefore, even when the steam temperature of the steam turbine 10 is raised to a high temperature, the high-temperature side seal ring 70, the low-temperature side seal ring 80 and the inner casing 20 can be formed of the same material as the conventional one.

In the steam turbine 10 of the first embodiment, the heat transfer from the inlet sleeve 40 to the outer casing 21 and the inner casing 20 can be suppressed by disposing the thermal barrier layer 90 between the inner circumference of the high-temperature side seal ring 70 and the outer circumference of the inlet sleeve 40 and between the high-temperature side seal ring 70 and the low-temperature side seal ring 80.

Here, a thermal barrier sheet may be disposed as the thermal barrier layer 90 between the high-temperature side seal ring 70 and the low-temperature side seal ring 80 instead of formation of the thermal barrier coating layer 100 on the top and bottom surfaces of the high-temperature side seal ring 70 or the low-temperature side seal ring 80.

The thermal barrier sheet is made of a material having a thermal conductivity lower than that of the material forming the high-temperature side seal ring 70 and the low-temperature side seal ring 80. As the thermal barrier sheet, for example, alumina fiber, silica fiber, zirconia fiber, hafnia fiber or the like can be used. Specifically, as the thermal barrier sheet, for example, Almax (a product of Mitsui Mining Co., Ltd.), Nextel (a product of 3M Co.), Altex (a product of Sumitomo Chemical Co., Ltd.), Saffil (a product of Saffil Ltd.), ZY series (a product of Zircar Products, Inc.) can be used.

For example, the thermal barrier sheet can be produced by a precursor fiberizing method, such as an inorganic salt method, a sol method, a slurry method or a precursor polymer method, that forms fibers of precursors of respective types of materials, and then performs sintering. And, the thermal barrier sheet can be produced by, for example, a melt spinning method or the like that melts a raw material by electrical heating or the like and spreads the resulting melt by a flow of air or a rotating disk.

Such a thermal barrier sheet has a thermal conductivity of, for example, about 0.1 to 0.5 W/(m·K), which is lower than that of the material forming the high-temperature side seal ring 70 and the low-temperature side seal ring 80.

Thus, the same action and effect as those described above can also be obtained by the structure having the thermal barrier sheet between the high-temperature side seal ring 70 and the low-temperature side seal ring 80.

Second Embodiment

Figure 4:
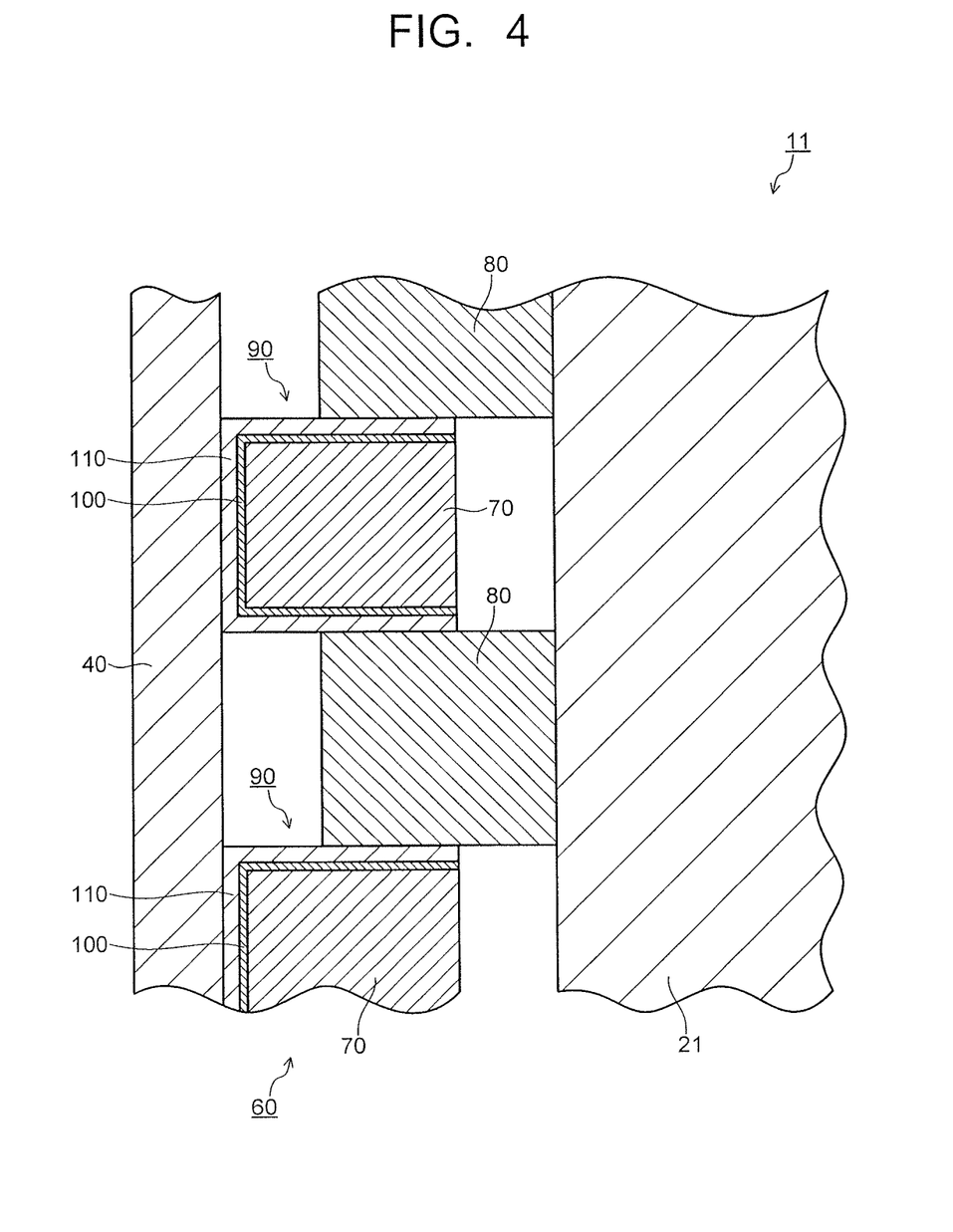
FIG. 4 is a diagram showing an enlarged cross section of seal rings between an inlet sleeve and an outer casing of the steam turbine of a second embodiment.

The structure of a steam turbine 11 of a second embodiment according to the invention is same as the structure of the steam turbine 10 of the first embodiment excepting the structure of the seal rings 60 between the inlet sleeve 40 and the inner casing 20 or the outer casing 21. Therefore, the structure of the seal rings 60 having a different structure is mainly described below.

FIG. 4 is a diagram showing enlarged cross sections of the seal rings 60 between the inlet sleeve 40 and the outer casing 21 of the steam turbine 11 of the second embodiment according to the invention. The structure of the seal rings 60 between the inlet sleeve inlet sleeve 40 and the outer casing 21 is shown here, but the structure of the seal rings 60 between the inlet sleeve 40 and the inner casing 20 also has the same structure.

As shown in FIG. 4, the thermal barrier coating layer 100 is formed on the inner circumferential surface of the high-temperature side seal ring 70, which is contacted to the outer circumference of the inlet sleeve 40, and on the top and bottom surfaces of the high-temperature side seal ring 70, which are contacted to the low-temperature side seal rings 80. And, the abrasion-resistant coating layer 110 is formed on the surface of the thermal barrier coating layer 100. In other words, the abrasion-resistant coating layer 110 forms the outermost layer.

The thermal barrier coating layer 100 is same to that of the steam turbine 10 of the first embodiment.

Here, the above-described oxide material forming the thermal barrier coating layer 100 has a relatively high hardness and can exhibit excellent abrasion resistance against simple sliding, but when it is used for the seal ring, a local impact load is applied by vibration and the like other than sliding. Therefore, the thermal barrier coating layer 100 is defected, possibly decreasing its thickness. Accordingly, the surface of the thermal barrier coating layer 100 is provided with the abrasion-resistant coating layer 110.

In view of the above, the abrasion-resistant coating layer 110 is preferably formed of a material having abrasion resistance better than the oxide material forming the thermal barrier coating layer 100. Therefore, as a material forming the abrasion-resistant coating layer 110, it is preferable to use, for example, a material containing a compound such as WC or CrC in a metal base, a material forming a hard compound by dispersion of nitrogen or boron into metal by a nitriding treatment or a boriding treatment, or the like. As the material containing a compound such as WC or CrC in the metal base, for example, cermet (WC—X or CrC—X, where X is a metal element and suitably has Ni, Co or the like as a main component) or the like can be used. As the material forming the hard compound by dispersion of nitrogen or boron into metal by the nitriding treatment or the boriding treatment, nitride (TiN, AlN, or $Fe_e$-3N), boride (FeB or $Fe_2B$) or the like can be used. In addition, for example, chromia ($Cr_2O_3$), diamond like carbon or the like can be used.

The abrasion-resistant coating layer 110 is formed by thermal spraying, physical vapor deposition, chemical vapor deposition, nitriding treatment, boriding treatment or the like.

Here, a method of forming the abrasion-resistant coating layer 110 is exemplified specifically.

For example, after the thermal barrier coating layer 100 is formed, the abrasion-resistant material such as cermet among the above-described abrasion-resistant materials is applied on the surface of the thermal barrier coating layer 100 by thermal spraying. At this time, it is suitable that the abrasion-resistant material is undergone, for example, high-speed flame spraying. And, before the abrasion-resistant material is applied by thermal spraying, the surface of the thermal barrier coating layer 100 may also be subjected to a blast treatment to improve the mechanical adhesion of the abrasion-resistant material. In addition, an intermediate layer of a MCrAlY alloy (M is a metal element having Ni, Co, Fe or the like as a main component) or the like having a coefficient of thermal expansion, which is intermediate between those of the materials forming the thermal barrier coating layer 100 and the abrasion-resistant coating layer 110, may be formed between the thermal barrier coating layer 100 and the abrasion-resistant coating layer 110. Thus, thermal stress on the thermal barrier coating layer 100 is relieved.

For example, after the thermal barrier coating layer 100 is formed, the abrasion-resistant coating layer 110 such as diamond like carbon is formed by physical vapor deposition.

For example, after the thermal barrier coating layer 100 is formed, a metal layer (for example, metal having Ni or Co as a main component) is formed on the surface of the thermal barrier coating layer 100 by thermal spraying, and the abrasion-resistant coating layer 110 is formed on the metal layer by nitriding treatment or boriding treatment. The nitriding treatment is a method of hardening by exposing to an atmosphere containing ammonia or nitrogen to penetrate nitrogen on the surface. The boriding treatment is a method of forming a boride layer by penetrating and spreading boron.

It is preferable that the abrasion-resistant coating layer 110 is formed to have a thickness of about 0.1 mm to 1.0 mm to maintain the abrasion resistance.

It was described above as an example that the thermal barrier coating layer 100 and the abrasion-resistant coating layer 110 were formed on the top and bottom surfaces of the high-temperature side seal ring 70 between the high-temperature side seal ring 70 and the low-temperature side seal ring 80 but may be formed on the top and bottom surfaces of the low-temperature side seal ring 80.

It was also described as an example that the thermal barrier coating layer 100 and the abrasion-resistant coating layer 110 were formed on the inner circumferential surface of the high-temperature side seal ring 70 between the inner circumference of the high-temperature side seal ring 70 and the outer circumference of the inlet sleeve 40, but the thermal barrier coating layer 100 and the abrasion-resistant coating layer 110 may be formed on the outer circumferential surface of the inlet sleeve 40.

According to the steam turbine 11 of the second embodiment, the seal rings 60 can be provided with the abrasion-resistant coating layer 110 to improve the mechanical strength at a contact portion between the inlet sleeve 40 and the high-temperature side seal ring 70 and a contact portion between the high-temperature side seal ring 70 and the low-temperature side seal ring 80. And, the provision of the thermal barrier coating layer 100 can suppress the heat transfer from the inlet sleeve 40 to the outer casing 21 and the inner casing 20.

Third Embodiment

Figure 5:
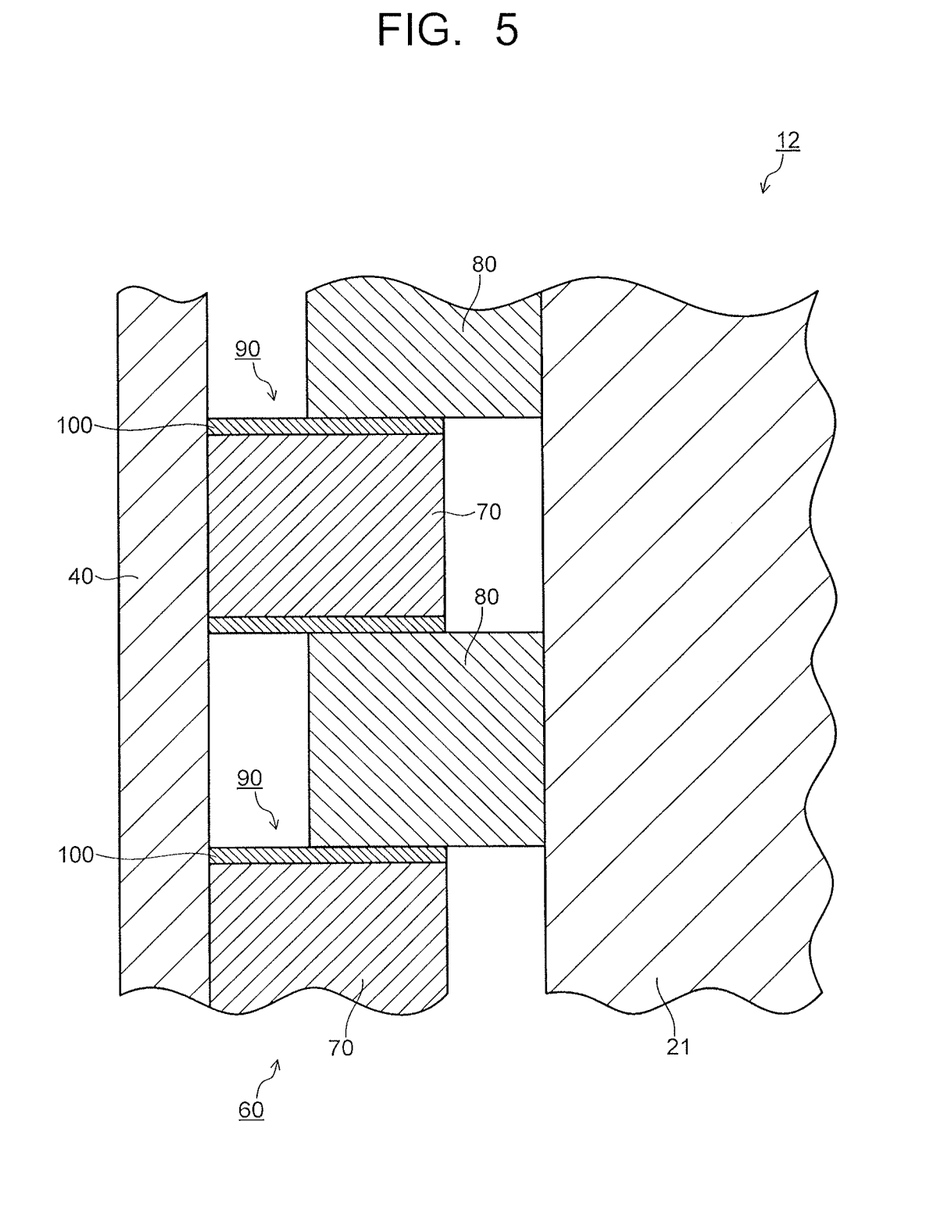
FIG. 5 is a diagram showing an enlarged cross section of seal rings between an inlet sleeve and an outer casing of the steam turbine of a third embodiment.

The structure of a steam turbine 12 of a third embodiment according to the invention is same to that of the steam turbine 10 of the first embodiment excepting the structure of the seal rings 60 between the inlet sleeve 40 and the inner casing 20 or the outer casing 21. Therefore, the structure of the seal rings 60 having a different structure is mainly described below.

FIG. 5 is a diagram showing enlarged cross sections of the seal rings 60 between the inlet sleeve 40 and the outer casing 21 in the steam turbine 12 of the third embodiment according to the invention. Here, the structure of the seal rings 60 between the inlet sleeve 40 and the outer casing 21 is shown, but the structure of the seal rings 60 between the inlet sleeve 40 and the inner casing 20 also has the same structure.

As shown in FIG. 5, the thermal barrier layer 90 is formed between the high-temperature side seal ring 70 and the low-temperature side seal ring 80. The thermal barrier layer 90 can be formed of, for example, the thermal barrier coating layer 100 formed on the top and bottom surfaces of the high-temperature side seal ring 70, which are contacted to the low-temperature side seal rings 80.

Here, the thermal barrier coating layer 100 is entirely formed on the top and bottom surfaces of the high-temperature side seal ring 70, but the thermal barrier coating layer 100 may be formed on only a portion which is contacted to the low-temperature side seal ring 80. And, the thermal barrier coating layer 100 may be formed on the top and bottom surfaces of the low-temperature side seal ring 80, which are contacted to the high-temperature side seal rings 70. And, as the thermal barrier layer 90, a thermal barrier sheet may be formed between the high-temperature side seal ring 70 and the low-temperature side seal ring 80 instead of the formation of the thermal barrier coating layer 100 between them.

The thermal barrier coating layer 100 and the thermal barrier sheet are same to those of the steam turbine 10 of the first embodiment.

Here, since the high-temperature side seal ring 70 is indirect contact with the inlet sleeve 40, a Ni-base alloy having heat resistance better than metallic materials such as CrMoV steel and 12Cr may be used in addition to such materials depending on the steam temperature. For example, the Ni-base alloy has a thermal conductivity of about 10 to 30 W/(m·K). Therefore, the thermal conductivity (for example, about 1 to 10 W/(m·K)) of the oxide material forming the thermal barrier coating layer 100 is lower than that of the material forming the high-temperature side seal ring 70.

When the seal rings 60 are configured as described above, heat is transmitted from the inlet sleeve 40 to the high-temperature side seal ring 70, the low-temperature side seal ring 80 and the outer casing 21 by heat conduction. The heat transfer is suppressed because the thermal barrier coating layer 100 is disposed between the high-temperature side seal ring 70 and the low-temperature side seal ring 80. Thus, the heat transfer from the high-temperature side seal ring 70 to the low-temperature side seal ring 80 and the outer casing 21 is suppressed, and the low-temperature side seal ring 80 and the outer casing 21 can be suppressed from having a temperature increase. Therefore, even when the steam temperature of the steam turbine 10 is raised to a high temperature, at least the low-temperature side seal ring 80 and the outer casing 21 can be formed of the same material as the conventional one.

The heat transfer between the inlet sleeve 40 and the inner casing 20 is also same to the above-described transmission of heat. That is, the heat transfer to the low-temperature side seal ring 80 and the inner casing 20 is suppressed, and the low-temperature side seal ring 80 and the inner casing 20 can be suppressed from having a temperature increase. Therefore, even when the steam temperature of the steam turbine 10 is raised to a high temperature, at least the low-temperature side seal ring 80 and the inner casing 20 can be formed of the same material as the conventional one.

According to the steam turbine 12 of the third embodiment, the heat transfer from the inlet sleeve 40 to the outer casing 21 and the inner casing 20 can be suppressed by disposing the thermal barrier layer 90 between the high-temperature side seal ring 70 and the low-temperature side seal ring 80.

Here, the abrasion-resistant coating layer 110 may be formed on the surface of the above-described thermal barrier coating layer 100 in the same manner as in the second embodiment. By forming the abrasion-resistant coating layer 110, the heat transfer from the inlet sleeve 40 to the outer casing 21 and the inner casing 20 can be suppressed, and the mechanical strength at a contact portion between the high-temperature side seal ring 70 and the low-temperature side seal ring 80 can also be improved.

Fourth Embodiment

Figure 6:
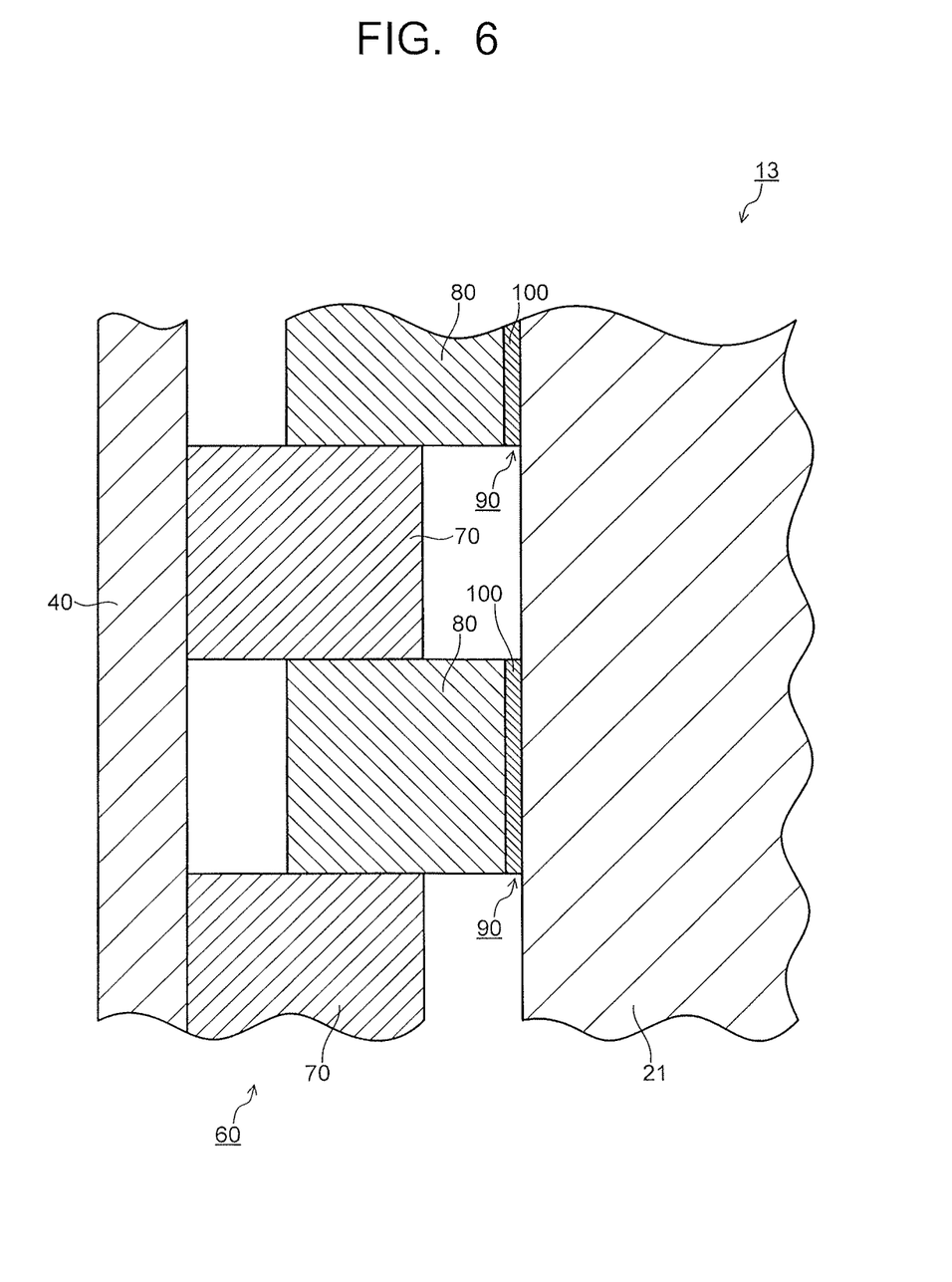
FIG. 6 is a diagram showing an enlarged cross section of seal rings between an inlet sleeve and an outer casing of the steam turbine of a fourth embodiment.

The structure of a steam turbine 13 of a fourth embodiment according to the invention is same to that of the steam turbine 10 of the first embodiment excepting the structure of the seal rings 60 between the inlet sleeve 40 and the inner casing 20 or the outer casing 21. Therefore, the structure of the seal rings 60 having a different structure is mainly described below.

FIG. 6 is a diagram showing enlarged cross sections of the seal rings 60 between the inlet sleeve 40 and the outer casing 21 of the steam turbine 13 of the fourth embodiment according to the invention. Here, the structure of the seal rings 60 between the inlet sleeve 40 and the outer casing 21 is shown, but the structure of the seal rings 60 between the inlet sleeve 40 and the inner casing 20 also has the same structure.

As shown in FIG. 6, the thermal barrier layer 90 is formed between the low-temperature side seal ring 80 and the outer casing 21. The thermal barrier layer 90 can be formed of the thermal barrier coating layer 100 which is formed on, for example, the outer circumferential surface of the low-temperature side seal ring 80, which is contacted to the outer casing 21. The thermal barrier coating layer 100 may be formed on the circumferential surface of the outer casing 21, which is contacted to the low-temperature side seal ring 80.

The thermal barrier coating layer 100 is same to that of the steam turbine 10 of the first embodiment.

Here, the high-temperature side seal ring 70 is in direct contact with the inlet sleeve 40, and the low-temperature side seal ring 80 is in direct contact with the high-temperature side seal ring 70. Therefore, the high-temperature side seal ring 70 and the low-temperature side seal ring 80 may be formed of a Ni-base alloy having heat resistance better than metallic materials such as CrMoV steel and 12Cr in addition to such materials depending on the steam temperature.

When the seal rings 60 are configured as described above, heat is transmitted from the inlet sleeve 40 to the high-temperature side seal ring 70, the low-temperature side seal ring 80 and the outer casing 21 by heat conduction. The heat transfer is suppressed because the thermal barrier coating layer 100 is disposed between the low-temperature side seal ring 80 and the outer casing 21. Thus, the heat transfer from the low-temperature side seal ring 80 to the outer casing 21 is suppressed, and the outer casing 21 can be suppressed from having a temperature increase. Therefore, even when the steam temperature of the steam turbine 13 is raised to a high temperature, at least the outer casing 21 can be formed of the same material as the conventional one.

The heat transfer between the inlet sleeve 40 and the inner casing 20 is also same to the above-described transmission of heat. That is, the heat transfer to the inner casing 20 is suppressed, and the inner casing 20 can be suppressed from having a temperature increase. Therefore, even when the steam temperature of the steam turbine 13 is raised to a high temperature, at least the inner casing 20 can be formed of the same material as the conventional one.

According to the steam turbine 13 of the fourth embodiment, the heat transfer from the inlet sleeve 40 to the outer casing 21 and the inner casing 20 can be suppressed by disposing the thermal barrier coating layer 100 between the low-temperature side seal ring 80 and the outer casing 21 and between the low-temperature side seal ring 80 and the inner casing 20.

Here, the abrasion-resistant coating layer 110 may be formed on the surface of the above-described thermal barrier coating layer 100 in the same manner as in the second embodiment. By forming the abrasion-resistant coating layer 110, the heat transfer from the inlet sleeve 40 to the outer casing 21 and the inner casing 20 can be suppressed, and the mechanical strength at a contact portion between the low-temperature side seal ring 80 and the outer casing 21 and a contact portion between the low-temperature side seal ring 80 and the inner casing 20 can also be improved.

In the above-described embodiment, for example, the seal rings between the inlet sleeve and the casings in the high-pressure turbine provided with the inner casing and the outer casing were described, but it is not exclusive. For example, this embodiment can also be applied to between the stationary blades 25 and the inner casing 20, between the inner casing 20 and the outer casing 21, and between the nozzle box 27 and the inner casing 20.

According to the above-described embodiment, even when the main steam is raised to a high temperature, it becomes possible to suppress the temperature of the casing or the like from increasing.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A steam turbine, comprising:
   a casing;
   a steam inlet pipe inserted into the casing for introducing steam;
   an annular high-temperature side seal ring disposed between the steam inlet pipe and the casing, the high-temperature side seal ring having an inner circumference contacted to an outer circumference of the steam inlet pipe;
   an annular low-temperature side seal ring disposed between the steam inlet pipe and the casing, the low-temperature side seal ring having inner and outer diameters larger than inner and outer diameters of the high-temperature side seal ring, the low-temperature side seal ring having an outer circumference contacted to the casing;
   a thermal barrier layer disposed between the inner circumference of the high-temperature side seal ring and the outer circumference of the steam inlet pipe and between the high-temperature side seal ring and the low-temperature side seal ring, the thermal barrier layer forming a thermal barrier coating layer on the inner circumference of the high-temperature side seal ring contacted with the outer circumference of the steam inlet pipe and a surface of the high-temperature side seal ring contacted with the low-temperature side seal ring; and an abrasion-resistant coating layer disposed on a surface of the thermal barrier coating layer.

2. The steam turbine according to claim 1, further comprising, a thermal barrier sheet is disposed as the thermal barrier layer between the high-temperature side seal ring and the low-temperature side seal ring instead of forming the thermal barrier coating layer on the surface of the high-temperature side seal ring contacted with the low-temperature side seal ring.

3. The steam turbine according to claim 2, wherein the thermal barrier sheet is formed of a material having a thermal conductivity lower than a thermal conductivity of a material forming the high-temperature side seal ring and the low-temperature side seal ring.

4. The steam turbine according to claim 1, wherein the thermal barrier layer is formed of a material having a thermal conductivity lower than a thermal conductivity of a material forming the high-temperature side seal ring and the low-temperature side seal ring.

5. The steam turbine according to claim 1, wherein the high-temperature side seal ring and the low-temperature side seal ring are disposed in an alternately stacked state.

6. A steam turbine comprising:

a casing;

a steam inlet pipe inserted into the casing for introducing steam;

an annular high-temperature side seal ring disposed between the steam inlet pipe and the casing, the high-temperature side seal ring having an inner circumference contacted to an outer circumference of the steam inlet pipe;

an annular low-temperature side seal ring disposed between the steam inlet pipe and the casing, the low-temperature side seal ring having inner and outer diameters larger than inner and outer diameters of the high-temperature side seal ring, the low-temperature side seal ring having an outer circumference contacted to the casino;

a thermal barrier layer disposed between the high-temperature side seal ring and the low-temperature side seal ring, the thermal barrier layer forming a thermal barrier coating layer on a surface of the high-temperature side seal ring contacted with the low-temperature side seal ring; and an abrasion-resistant coating layer disposed on a surface of the thermal barrier coating layer.

7. The steam turbine according to claim 6, further comprising, a thermal barrier sheet is disposed as the thermal barrier layer between the high-temperature side seal ring and the low-temperature side seal ring instead of forming the thermal barrier coating layer on the surface of the high-temperature side seal ring contacted with the low-temperature side seal ring.

8. The steam turbine according to claim 7, wherein the thermal barrier sheet is formed of a material having a thermal conductivity lower than a thermal conductivity of a material forming the high-temperature side seal ring and the low-temperature side seal ring.

9. The steam turbine according to claim 6, wherein the thermal barrier layer is formed of a material having a thermal conductivity lower than a thermal conductivity of a material forming the high-temperature side seal ring and the low-temperature side seal ring.

10. The steam turbine according to claim 6, wherein the high-temperature side seal ring and the low-temperature side seal ring are disposed in an alternately stacked state.

11. A steam turbine, comprising:

a casing;

a steam inlet pipe inserted into the casing for introducing steam;

an annular high-temperature side seal ring disposed between the steam inlet pipe and the casing, the high-temperature side seal ring having an inner circumference contacted to an outer circumference of the steam inlet pipe; an annular low-temperature side seal ring disposed between the steam inlet pipe and the casing, the low-temperature side seal ring having inner and outer diameters larger than inner and outer diameters of the high-temperature side seal ring, the low-temperature side seal ring having an outer circumference contacted to the casing;

a thermal barrier layer disposed between the outer circumference of the low-temperature side seal ring and the casing, the thermal barrier layer forming a thermal barrier coating layer on the outer circumference of the low-temperature side seal ring contacted with the casing; and an abrasion-resistant coating layer disposed on a surface of the thermal barrier coating layer.

12. The steam turbine according to claim 11, wherein the thermal barrier layer is formed of a material having a thermal conductivity lower than a thermal conductivity of a material forming the high-temperature side seal ring and the low-temperature side seal ring.

13. The steam turbine according to claim 11, wherein the high-temperature side seal ring and the low-temperature side seal ring are disposed in an alternately stacked state.

* * * * *

UNITED STATES PATENT AND TRADEMARK OFFICE
CERTIFICATE OF CORRECTION

| | | |
|---|---|---|
| PATENT NO. | : 9,045,993 B2 | Page 1 of 1 |
| APPLICATION NO. | : 13/421569 | |
| DATED | : June 2, 2015 | |
| INVENTOR(S) | : Inomata et al. | |

It is certified that error appears in the above-identified patent and that said Letters Patent is hereby corrected as shown below:

Claims

Claim 2, column 11, line 10, change "is disposed" to --disposed--.

Claim 7, column 12, line 3, change "is disposed" to --disposed--.

Signed and Sealed this
Twelfth Day of January, 2016

Michelle K. Lee
*Director of the United States Patent and Trademark Office*